(12) United States Patent
Ernst et al.

(10) Patent No.: US 8,463,496 B2
(45) Date of Patent: Jun. 11, 2013

(54) DECOUPLING CONTROL ARCHITECTURE FOR PRESSURE AND FLOW CONTROLS IN SERIES

(75) Inventors: Jeffrey Ernst, Wethersfield, CT (US); Kenneth F. Bibbins, Simsbury, CT (US); Bruce R. Schroder, Agawam, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 182 days.

(21) Appl. No.: 13/176,791

(22) Filed: Jul. 6, 2011

(65) Prior Publication Data

US 2013/0013145 A1 Jan. 10, 2013

(51) Int. Cl.
*F02C 6/08* (2006.01)

(52) U.S. Cl.
USPC .......... 701/36; 454/74; 60/784; 60/785; 60/39.093

(58) Field of Classification Search
CPC ....................................... B64D 13/06
USPC ............................. 454/74; 701/36
See application file for complete search history.

(56) References Cited

U.S. PATENT DOCUMENTS

| | | | |
|---|---|---|---|
| 3,981,466 A | 9/1976 | Shah | |
| 5,143,329 A | 9/1992 | Coffinberry | |
| 5,155,991 A * | 10/1992 | Bruun | 60/785 |
| 5,860,283 A | 1/1999 | Coleman et al. | |
| 5,956,960 A | 9/1999 | Niggeman | |
| 6,058,715 A | 5/2000 | Strang et al. | |
| 6,124,646 A * | 9/2000 | Artinian et al. | 290/52 |
| 6,817,575 B1 | 11/2004 | Munoz et al. | |
| 2009/0298407 A1 | 12/2009 | Anderson et al. | |

\* cited by examiner

*Primary Examiner* — Khoi Tran
*Assistant Examiner* — Ryan Rink
(74) *Attorney, Agent, or Firm* — Kinney & Lange, P.A.

(57) ABSTRACT

An electronic controller for a sub-system of an air management system including an area conversion module and a sub-system area control module. The area conversion module includes inputs for a bleed output pressure set point, a bleed output pressure measurement, a sub-system parameter set point, a sub-system parameter measurement, and a sub-system output pressure measurement; and sub-modules for calculating an area set point and an area measurement. The sub-modules generate the area set point as a function of the engine bleed output pressure set point, the sub-system parameter set point, and the sub-system output pressure measurement; and the area measurement as a function of the bleed output pressure measurement, the sub-system parameter measurement, and the sub-system output pressure measurement. The sub-system area control module generates a control output for the sub-system as a function of the calculated area set point and the calculated area measurement.

15 Claims, 2 Drawing Sheets

US 8,463,496 B2

DECOUPLING CONTROL ARCHITECTURE FOR PRESSURE AND FLOW CONTROLS IN SERIES

BACKGROUND

The present invention relates to electronic control systems aboard aircraft. In particular, the invention relates to electronic control system architecture for air management systems aboard aircraft.

An aircraft air management system supplies bleed air to a variety of aircraft air management sub-systems, such as an environmental control system to maintain aircraft cabin air pressures and temperatures within a target range for the safety and comfort of aircraft passengers, anti-icing systems, inert gas systems, air-driven pumps, etc. This is done through the use of compressed air taken from two compressor stages (bleed air) of an engine propelling the aircraft. A control valve operates in response to electronic control signals from the air management system to control bleed output pressure. Air pressure in the bleed output pressure line is measured by at least one pressure sensor which provides this information to the air management system. The air management system uses the air pressure information to command the control valve to provide the desired bleed air pressure to the air management system. This is referred to as the bleed air control loop.

Downstream from the bleed air control loop are the air management sub-systems that draw airflow from the outlet of the bleed system. Each of the sub-systems has its own control valve to adjust a control parameter (sub-system parameter), for example, a pressure or a flow, in a particular sub-system, along with a corresponding sensor to measure the control parameter. As with bleed air, the air management system also maintains control loops for each of the sub-systems, receiving sensor measurements and generating control commands for the control valves. However, because the downstream sub-system control elements (control valve, sensor) are in series with the upstream bleed system control elements, the downstream sub-system control loops are pneumatically coupled to the upstream bleed control loop. That is, a control change in a sub-system valve position impacts not only the sub-system sensor, as it should, but also the upstream bleed output pressure sensor. This triggers a control response in the bleed control loop resulting in a change in the bleed control valve. Similarly, because the control loops are coupled, a control change in the bleed control valve impacts not only the bleed output pressure sensor, but also the downstream sub-system sensor, triggering a control response in the downstream sub-system control loop resulting in an unintended change in the sub-system valve position. Thus, a single change can oscillate back and forth between coupled control loops, creating control instabilities resulting in rapid, but unnecessary, control changes. This coupling creates an unnecessary burden on the air management system electronics and causes the bleed and sub-system control valves to wear out much faster than without the control instabilities caused by the coupled control loops.

One solution is to operate coupled control loops of concern at very different rates. For example, if a bleed control loop is operated at a very fast rate and downstream sub-system control loop is operated at a slower rate, all the sub-system control loop sees a very stable pressure from the bleed system. Interaction between the loops is minimized because of the different time scale of the control loops. However, this constrains the choice of components and ultimate performance of the air management system. Making bleed control loops faster requires additional constraints be placed when designing the components which impact system cost and weight. Slowing down sub-system control loops reduces their responsiveness and performance of the sub-systems.

SUMMARY

One embodiment of the present invention is an electronic controller for a sub-system of an air management system. The controller includes an area conversion module and a sub-system area control module. The area conversion module includes an engine bleed output pressure set point input; an engine bleed output pressure measurement input; a sub-system parameter set point input; a sub-system parameter measurement input; a sub-system output pressure measurement input; an area set point sub-module, and an area measurement sub-module. The area set point sub-module generates a calculated area set point output as a function of at least the engine bleed output pressure set point input, the sub-system parameter set point input, and the sub-system output pressure measurement input. The area measurement sub-module generates a calculated area measurement output as a function of at least the engine bleed output pressure measurement input, the sub-system parameter measurement input, and the sub-system output pressure measurement input. The sub-system area control module generates a control output for the sub-system. The control output is a function of the area conversion module calculated area set point output and the area conversion module calculated area measurement output.

DETAILED DESCRIPTION

The present invention is an electronic controller for an air management system that decouples a sub-system control loop from a bleed air control loop. The controller features an area conversion module that employs a downstream pressure measurement of a sub-system's output in combination with a bleed set point, a bleed output pressure measurement, a sub-system parameter set point and a sub-system parameter sensor measurement such that sub-system control is not based solely upon a single sensor input, but upon the subsystem parameter sensor combined with other sensor and set point inputs available to the air management system. The area conversion module employs these inputs to generate calculated area set points and calculated area measurements. The calculated area set points and calculated area measurements are employed by a sub-system area control module to generate a control command for the sub-system. Controlling a sub-system in this manner, by calculated area, essentially controls a sub-system by its overall restrictiveness to flow. Controlling by restrictiveness to flow, based on the inputs to the area conversion module, limits the reaction of the sub-system to upstream pressure disturbances and improves its control stability.

Figure 1:
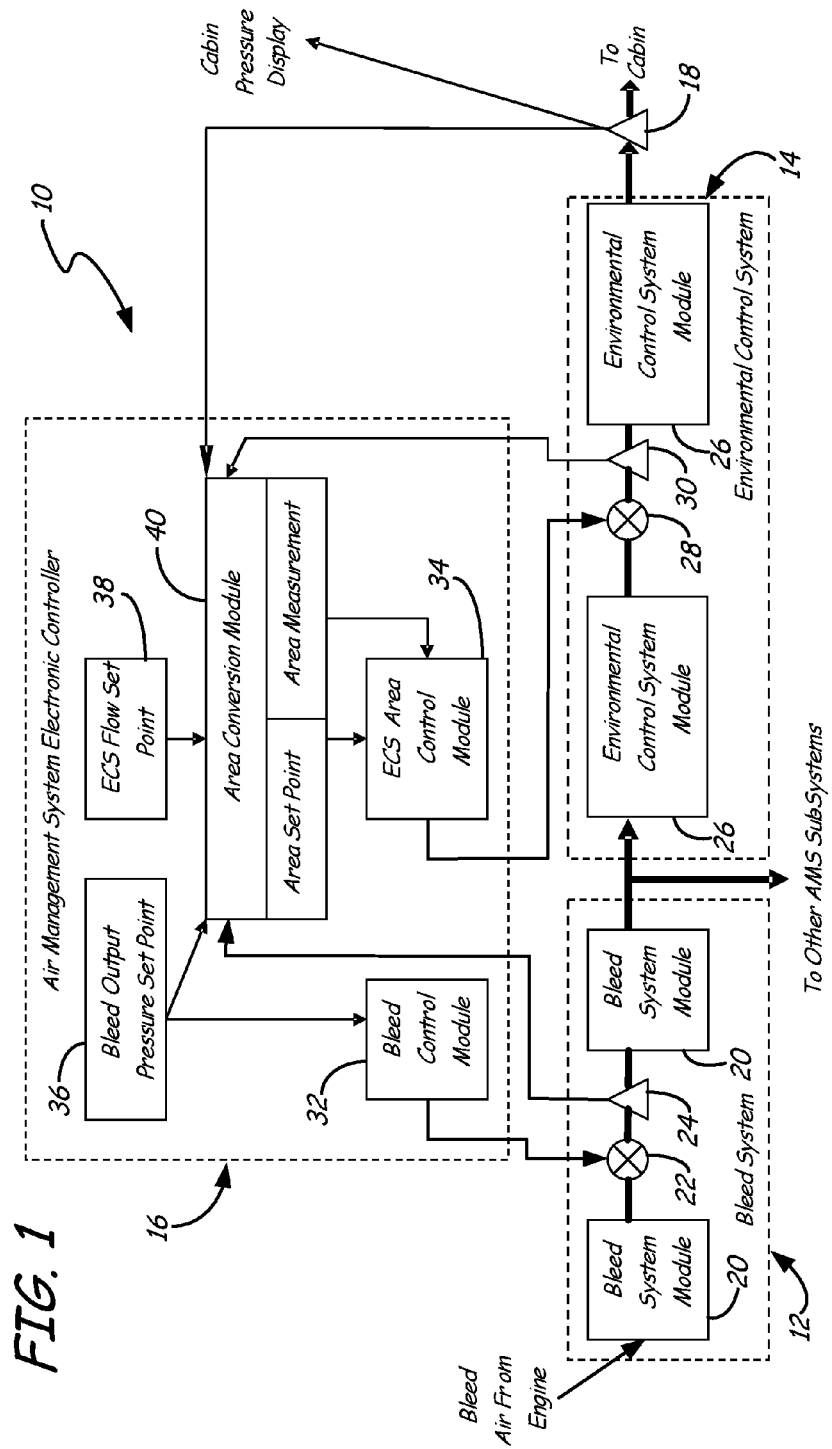
FIG. 1 is a representative diagram of an air management system comprising an embodiment of an air management system electronic controller of the present invention.

FIG. 1 is a representative diagram of an air management system (AMS) comprising an embodiment of an AMS electronic controller of the present invention. FIG. 1 shows AMS 10 which includes bleed system 12, environmental control system (ECS) 14 (as the AMS sub-system for this illustration), and AMS electronic controller 16. Also shown in FIG.

1 is cabin pressure sensor 18. Cabin pressure sensor 18 measures pressure for an aircraft cabin which is also a measure of an output pressure for ECS 14. Bleed system 12 includes bleed system module 20, bleed control valve 22, and bleed output pressure sensor 24. Bleed system module 20 includes heat exchangers, control valves, and ducts to provide bleed air at a generally lower pressure and temperature than that directly available from engine compressor stages. Bleed control valve 22 is a pressure regulating valve limiting the pressure output of bleed system 12 in response to an electrical signal. Bleed output pressure sensor 24 is a pressure transducer for measuring the pressure output of bleed system 12 and producing an electrical signal representative of the measured pressure. As illustrated in FIG. 1, portions of bleed system module 20 may be upstream or downstream of bleed control valve 22 and bleed output pressure sensor 24. ECS 14 includes ECS module 26, ECS flow control valve 28, and ECS flow sensor 30. ECS module 26 includes air cycle machines, heat exchangers, control valves and ducts to provide aircraft cabin air at pressures and temperatures within a target range for the safety and comfort of aircraft passengers. ECS flow control valve 28 operates in response to an electrical signal to adjust a flow of pressurized air from bleed system 12. ECS flow sensor 30 is a flow sensor for measuring flow through ECS 14 and producing an electrical signal representative of the measured flow. As illustrated in FIG. 1, portions of ECS module 26 may be upstream or downstream of ECS flow control valve 28 and ECS flow sensor 30. Flow through ECS 14 is the sub-system parameter for this illustration.

AMS electronic controller 16 includes bleed control module 32, ECS area control module 34, bleed output pressure set point 36, ECS flow set point 38, and area conversion module 40. Bleed control module 32 and ECS control module 34 each generate electrical control signals by the application of control laws to input signals. The input signals typically include a target (set point) value and a measured value of a parameter to be controlled. Bleed output pressure set point 36 is a set point value for a target bleed pressure stored in AMS electronic controller 16. Bleed output pressure set point 36 is typically a fixed reference value determined by the design of AMS 10, but may change as a function of altitude for the aircraft. Similarly, ECS flow set point 38 is a set point value for a target ECS flow rate stored in AMS electronic controller 16. Area conversion module 40 converts received set point values and measurement values into area set point values and area measurement values. Area conversion module 40 is described in greater detail below in reference to FIG. 2.

All connections in AMS 10 are either pneumatic or electric. In FIG. 1, pneumatic connections are bold and electric connections are not bold. As shown in FIG. 1, bleed system 12 pneumatically connects an engine (not shown) to ECS 14. Bleed system 12 also pneumatically connects the engine to other AMS sub-systems, if any. ECS 14 pneumatically connects to cabin pressure sensor 18 and to the aircraft cabin (not shown). Within bleed system 12, the pneumatic connection from the engine connects to a portion of bleed system module 20 which connects in turn to bleed control valve 22, which in turn connects to bleed output pressure sensor 24, and then on to the remainder of bleed system module 20. Within ECS 14, the pneumatic connection from bleed system 12 connects to a portion of ECS module 26, then to ECS flow control valve 28, which in turn connects to ECS flow sensor 30, and then on to the remainder of ECS module 26.

As further shown in FIG. 1, bleed control module 32 is electrically connected to receive signals from bleed output pressure sensor 24 and to send control signals to bleed control valve 22. In addition, bleed control module 32 is electrically connected within AMS electronic controller 16 to receive bleed output pressure set point 36. ECS area control module 34 is electrically connected to receive area set point values and area measurement values from area conversion module 40 and to send control signals to ECS flow control valve 28. Area conversion module 40 is electrically connected to receive signals from cabin pressure sensor 18, bleed output pressure sensor 24, ECS flow sensor 30 and to send area set point values and area measurement values to ECS area control module 34. In addition, area conversion module 40 is electrically connected within AMS electronic controller 16 to receive bleed output pressure set point 36 and ECS flow set point 38.

In operation, AMS electronic controller 16 controls bleed system 12 through bleed control module 32. Bleed control module 32 generates a control signal for bleed control valve 22 based upon the application of control laws to actual bleed output pressure as measured by bleed output pressure sensor 24 and bleed output pressure set point 36. AMS electronic controller 16 controls ECS 14 through ECS area control module 34. ECS area control module 24 generates a control signal for ECS flow control valve 28 based upon the application of control laws to the area measurement and area set point values provided by area conversion module 40. Area conversion module 40 generates area set point values and area measurement values as a function of signals from cabin pressure sensor 18, bleed output pressure sensor 24, ECS flow sensor 30, bleed output pressure set point 36, and ECS flow set point 38, as described below in reference to FIG. 2.

Figure 2:
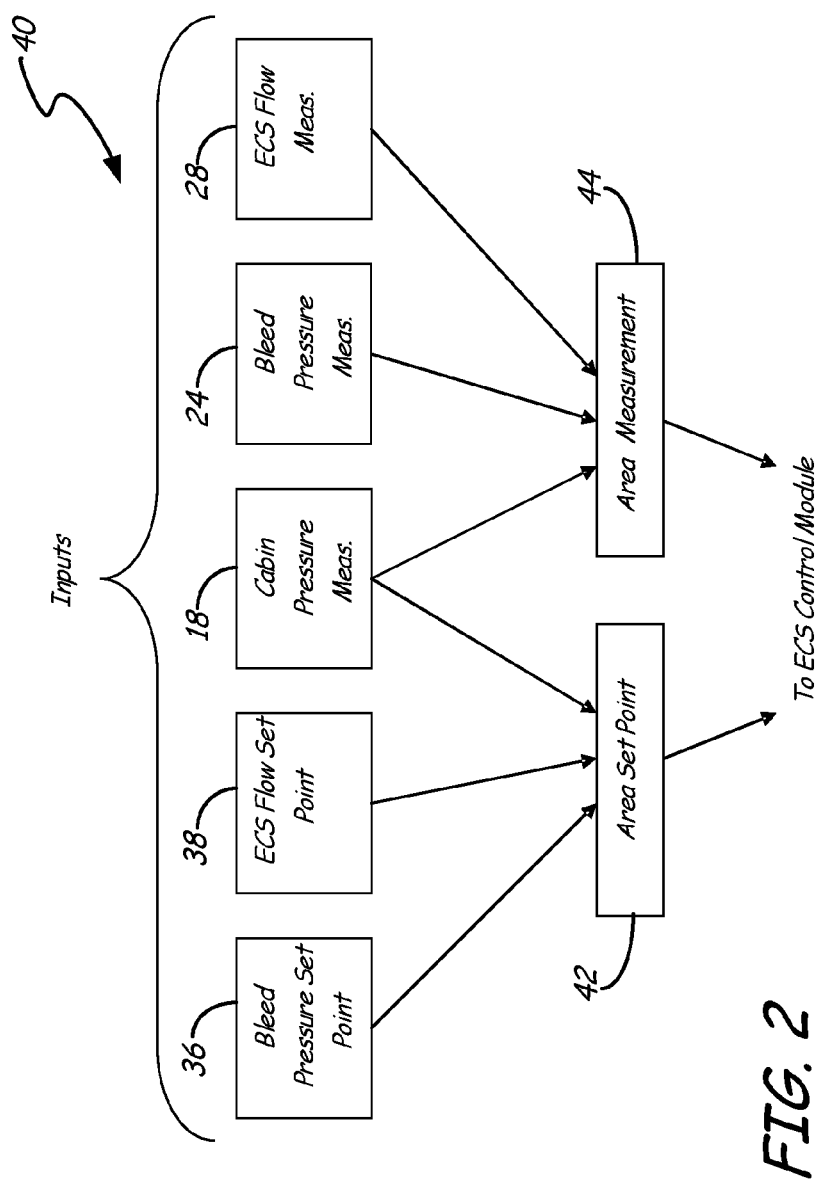
FIG. 2 is a representative diagram of the area conversion module of FIG. 1.

FIG. 2 is a representative diagram of area conversion module 40 of FIG. 1. As shown in FIG. 2, area conversion module 40 includes area set point sub-module 42, area measurement sub-module 44 and five inputs to area conversion module 40 as described above in reference to FIG. 1: input from bleed output pressure set point 36, input from bleed output pressure sensor 24, input from ECS flow set point 38, input from ECS flow sensor 30, and input from cabin pressure sensor 18.

Area set point sub-module 42 is connected to the inputs from bleed output pressure set point 36, ECS flow set point 38, and cabin pressure sensor 18. Area measurement sub-module 44 is connected to the inputs from cabin pressure sensor 18, bleed output pressure sensor 24, and ECS flow sensor 30. Both area set point sub-module 42 and area measurement sub-module 44 are connected to ECS area control module 34, providing the connection between area conversion module 40 and ECS area control module 34 described above in reference to FIG. 1.

In operation, area set point sub-module 42 and area measurement sub-module 44 each calculate an area representing a restriction of flow through a sub-system of AMS 10 based on three parameters. In this embodiment, where the sub-system of AMS 10 is ECS 14, two pressure values and a flow value are employed for the calculation. It is known that for unchoked flow, as an approximation, an area representing the restriction is a function of the ratio of flow rate to the square root of a difference between two pressures, one on either side of the restriction, multiplied by the upstream pressure. For choked flow, as an approximation, an area representing the restriction is a function of the ratio of flow rate to the upstream pressure. Area set point sub-module 42 employs bleed output pressure set point 36, a pressure measurement from cabin pressure sensor 18, and ECS flow set point 38 to generate a calculated area set point. Similarly, area measurement sub-module 44 employs bleed output pressure sensor 24, a pressure measurement from cabin pressure sensor 18, and a flow measurement from ECS flow sensor 30 to generate a calculated area measurement. Area conversion module 40 sends the calculated area set point and the calculated area measurement from area set point sub-module 42 and area measurement sub-module 44 to ECS area control module 34 to be employed as described above in reference to FIG. 1.

In the embodiments described above, the AMS sub-system is an ECS and the sub-system parameter is a flow through the ECS. However, it is understood that the invention applies to all AMS sub-systems that are in series with a bleed system. Similar to the ECS 14, other AMS sub-systems may also include a flow sensor or pressure sensor downstream of one or more control valves, such as control valve 28 and flow sensor 30 of FIG. 1. For example, the AMS sub-system may be: a wing anti-ice system where the sub-system parameter is an inlet air pressure downstream of the control valve of the wing anti-ice system; an engine anti-ice system where the sub-system parameter is an inlet air pressure downstream of the control valve of the engine anti-ice system; or an inert gas system where the sub-system parameter is an inlet air pressure downstream of the control valve of the inert gas system. Further, although the embodiment is described in terms of a single AMS sub-system for ease of illustration, it is understood that the invention applies to applications involving multiple AMS sub-systems.

The present invention decouples a bleed control loop from a sub-system control loop in an AMS electronic controller by controlling a calculated area representing total restrictiveness through the sub-system. In the present invention, control instabilities inherent in coupled systems are eliminated because the control loops are decoupled. Without oscillations from the control instabilities, control valve lifetime is greatly increased. Embodiments of the present invention have wide latitude in loop operating rates and component selection, resulting in air management systems that are lower in cost and higher in performance. An additional feature of this invention is that no additional sensors or control elements are required beyond those already typically present in an aircraft to achieve the higher level of performance.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electronic controller for a sub-system of an air management system, the controller comprising:
   an area conversion module, the area conversion module comprising:
   an input for receiving an engine bleed output pressure set point;
   an input for receiving an engine bleed output pressure measurement;
   an input for receiving a sub-system parameter set point;
   an input for receiving a sub-system parameter measurement;
   an input for receiving a sub-system output pressure measurement;
   an area set point sub-module to generate a calculated area set point output representing a restriction of flow through a subsystem, as a function of at least the engine bleed output pressure set point input, the sub-system parameter set point input, and the sub-system output pressure measurement input; and
   an area measurement sub-module to generate a calculated area measurement output representing a restriction of flow through a subsystem, as a function of at least the engine bleed output pressure measurement input, the sub-system parameter measurement input, and the sub-system output pressure measurement input; and
   a sub-system area control module to generate a control output to control the sub-system, wherein the control output is a function of the area conversion module calculated area set point output and the area conversion module calculated area measurement output.

2. The controller of claim 1, wherein the sub-system is an environmental control system, and the sub-system parameter is air flow rate or inlet air pressure downstream of a control valve of the environmental control system.

3. The controller of claim 1, wherein the sub-system is a wing anti-ice system, and the sub-system parameter is air flow rate or inlet air pressure downstream of a control valve of the wing anti-ice system.

4. The controller of claim 1, wherein the sub-system is an engine anti-ice system, and the sub-system parameter is air flow rate or inlet air pressure downstream of a control valve of the engine anti-ice system.

5. The controller of claim 1, wherein the sub-system is an inert gas system, and the sub-system parameter is air flow rate or inlet air pressure downstream of a control valve of the inert gas system.

6. An air management system comprising:
   an electronic controller for a sub-system, the controller comprising: an area conversion module, the area conversion module comprising:
   an input for receiving an engine bleed output pressure set point;
   an input for receiving an engine bleed output pressure measurement;
   an input for receiving a sub-system parameter set point;
   an input for receiving a sub-system parameter measurement;
   an input for receiving a sub-system output pressure measurement;
   an area set point sub-module to generate a calculated area set point output representing a restriction of flow through a subsystem, as a function of at least the engine bleed output pressure set point input, the sub-system parameter set point input, and the sub-system output pressure measurement input;
   and an area measurement sub-module to generate a calculated area measurement output representing a restriction of flow through a subsystem, as a function of at least the engine bleed output pressure measurement input, the sub-system parameter measurement input, and the sub-system output pressure measurement input;
   and a sub-system area control module to generate a control output to control the sub-system, wherein the control output is a function of the area conversion module calculated area set point output and the area conversion module calculated area measurement output;
   and an engine bleed control module to generate a control output to control the engine bleed system, wherein the control output is a function of the engine bleed output pressure set point input and the engine bleed output pressure measurement input.

7. The system of claim 6, wherein the sub-system is an environmental control system, and the sub-system parameter is air flow rate or inlet air pressure downstream of a control valve of the environmental control system.

8. The system of claim 6, wherein the sub-system is a wing anti-ice system, and the sub-system parameter is air flow rate or inlet air pressure downstream of a control valve of the wing anti-ice system.

9. The system of claim 6, wherein the sub-system is an engine anti-ice system, and the sub-system parameter is air flow rate or inlet air pressure downstream of a control valve of the engine anti-ice system.

10. The system of claim 6, wherein the sub-system is an inert gas system, and the sub-system parameter is air flow rate or inlet air pressure downstream of a control valve of the inert gas system.

11. A method for controlling a sub-system of an air management system by a controller, the method comprising:
receiving an engine bleed system output pressure set point;
receiving a sub-system parameter set point;
measuring the engine bleed system output pressure corresponding to the received engine bleed system output pressure set point;
measuring the sub-system parameter corresponding to the received sub-system parameter set point;
measuring the sub-system output pressure;
generating by the controller a calculated area set point representing a restriction of flow through a subsystem as a function of at least the engine bleed system output pressure set point, the sub-system parameter set point, and the sub-system output pressure measurement;
generating by the controller a calculated area measurement output representing a restriction of flow through a sub-system as a function of at least the engine bleed system output pressure measurement, the sub-system parameter measurement, and the sub-system output pressure measurement;
generating by the controller a control command as a function of the generated calculated area measurement to the generated calculated area set point; and
transmitting the generated control command to control the sub-system.

12. The method of claim 11, wherein the sub-system is an environmental control system, and the sub-system parameter is air flow rate or inlet air pressure downstream of a control valve of the environmental control system.

13. The method of claim 11, wherein the sub-system is a wing anti-ice system, and the sub-system parameter is air flow rate or inlet air pressure downstream of a control valve of the wing anti-ice system.

14. The method of claim 11, wherein the sub-system is an engine anti-ice system, and the sub-system parameter is air flow rate or inlet air pressure downstream of a control valve of the engine anti-ice system.

15. The method of claim 11, wherein the sub-system is an inert gas system, and the sub-system parameter is air flow rate or inlet air pressure downstream of a control valve of the inert gas system.

* * * * *